United States Patent [19]

Ippen et al.

[11] Patent Number: 4,854,359
[45] Date of Patent: Aug. 8, 1989

[54] ANTISKID DEVICE, PARTICULARLY FOR PNEUMATICALLY TIRED VEHICLE WHEELS ON SNOW AND ICE SURFACES

[76] Inventors: Heiko Ippen, Wilhelmshofallee 140, D-4150 Krefeld; Werner Preusker, Kleine Nisterstrasse 15, D-5239 Atzelgift, both of Fed. Rep. of Germany

[21] Appl. No.: 814,451

[22] Filed: Dec. 30, 1985

[30] Foreign Application Priority Data

Jan. 29, 1985 [DE] Fed. Rep. of Germany ... 8502229[U]
Feb. 7, 1985 [DE] Fed. Rep. of Germany ... 8503359[U]
Oct. 29, 1985 [DE] Fed. Rep. of Germany ... 8530606[U]

[51] Int. Cl.$^4$ ............................................. B60C 27/14
[52] U.S. Cl. ..................................... 152/216; 152/223; 152/226
[58] Field of Search ............... 152/213 A, 216, 223, 152/226, 231, 225 R

[56] References Cited

U.S. PATENT DOCUMENTS

| | | | |
|---|---|---|---|
| 2,119,447 | 5/1938 | Stahl et al. | 152/223 |
| 3,130,767 | 4/1964 | Davis | 152/223 |
| 4,228,838 | 10/1980 | Zerlauth | 152/216 |
| 4,243,087 | 1/1981 | Marchionda | 152/231 X |
| 4,388,754 | 6/1983 | Ilon | 152/223 X |
| 4,405,006 | 9/1983 | Preusker | 152/216 X |
| 4,576,214 | 3/1986 | Preusker | 152/226 X |

Primary Examiner—Robert A. Dawson
Assistant Examiner—Ramon R. Hoch
Attorney, Agent, or Firm—Antonelli, Terry, Wands

[57] ABSTRACT

The antiskid device includes a fixing disk, which can be mounted on the wheel rim of a motor vehicle and can remain thereon during the winter months, and a supporting disk mountable on the fixing disk and lockable therewith by means of a retaining ring on putting the antiskid device into operation. The supporting disk is provided with a plurality of radially arranged support arms, which engage over the tire tread and which carry a chain grid as the snow chain which, in the operating state, engages over the tire tread, so as to provide an antiskid device which can be effortlessly mounted on a wheel and provide a snow chain-like action.

33 Claims, 12 Drawing Sheets

Fig. 15
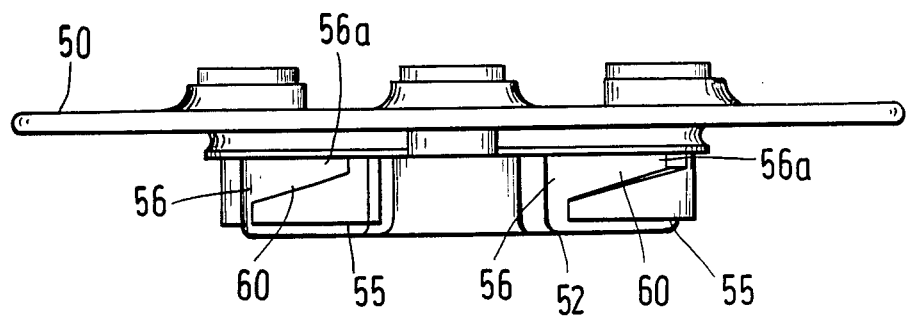
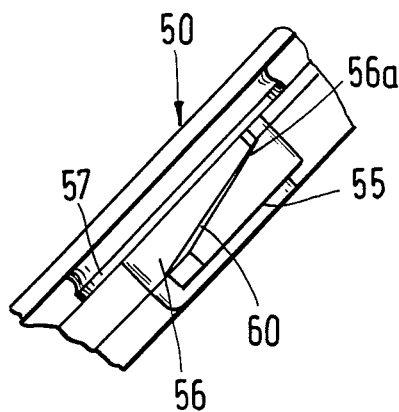
Fig. 16

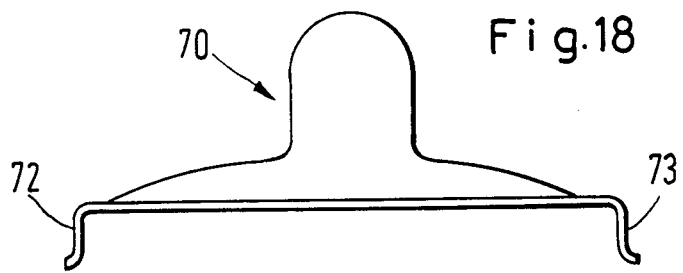
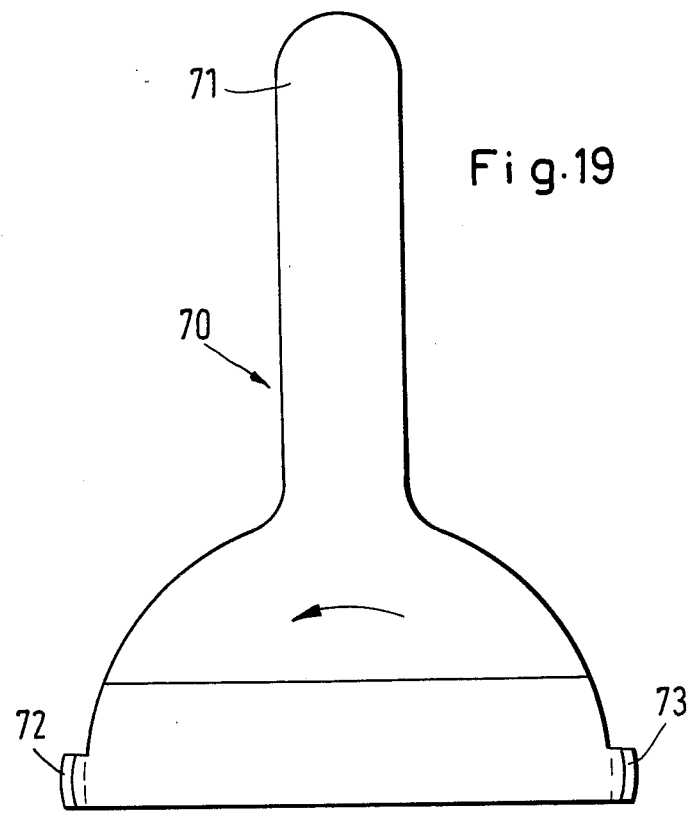

ANTISKID DEVICE, PARTICULARLY FOR PNEUMATICALLY TIRED VEHICLE WHEELS ON SNOW AND ICE SURFACES

BACKGROUND OF THE INVENTION

The present invention relates to an antiskid device, particularly for pneumatically tired vehicle wheels on snow and ice surfaces.

Snow chains as well as winter tires are used when driving motor vehicles in winter, particularly on snow-covered uphill and downhill gradients. It is often difficult to fit snow chains to motor vehicle tires and in addition it is necessary to drive with them in such a way that the road is not damaged, i.e. the snow chains have to be removed on dry road portions following snow or ice-covered portions, Moreover, travelling on dry roads, snow chains are subject to a high degree of wear and also do not allow high speeds.

SUMMARY OF THE INVENTION

The problem of the present invention is to provide an antiskid device of the aforementioned type, which not only permits effortless fitting and removal and which is adapted to the pressing or squeezing movements of the vehicle tire, but which also has the effectiveness of snow chains, so that the travelling characteristics of the vehicle on snow-covered roads is improved and the effectiveness of the antiskid device on snow-covered roads with uphill or down hill gradients is improved. In addition, the antiskid device is constructed in such a way that it is usable for many types of wheel disks or rims, without any changeover or reequipping being necessary.

According to the invention this problem is solved by an antiskid device, particularly for pneumatically tired vehicle wheels on snow and ice surfaces, wherein (a) the antiskid arms are placed on a supporting disk provided with a central opening, so as to pivot in a small range about axes parallel to the wheel disk bearing axis.

(b) for fixing the supporting disk to the wheel disk or rim, a circular fixing disk with a plurality of openings for the rim screws, wheel studs, etc. is provided, which is centrally provided with a circular hub having a smaller diameter than the fixing disk diameter, and which has at a distance from the fixing disk adjacent to its upper edge on its periphery, a plurality of bead-like shoulders, with slideways and guideways formed beneath the same and which taper in the circumferential direction of the hub from inlets and carries the supporting disk with antiskid arms surrounding the hub, being secured by means of a retaining ring mounted on the hub having locking webs bringing about a bayonet-like locking effect introducible into the slideways and guideways on the hub with conically tapering portions extending towards the inlet and with on its inner wall surface at least one leaf spring-like catch, which in the locked position of the retaining ring engages on the fixing disk in a recess on the hub periphery and is supported on a stop so as to prevent undesired unlocking and can be transferred by means of an unlocking key from the locking position into an unlocking position.

(c) the supporting disk with the antiskid arms is arranged with a clearance on the hub of the fixing disk for performing eccentric rotary movements.

In addition, the antiskid device comprises a fixing disk fixable to the wheel disk or rim with a supporting disk having a central opening having a plurality of equi-distantly spaced, radially directed support arms of a prebent profile of a plastic or some other suitable material engaging over the tire tread and a snow chain fixed to the support arm, which is constructed as a chain grid and is hung in between the support arms.

An antiskid device constructed in this way can be effortlessly fitted and removed, because the fixing disk remains on the wheel disk or rim and only the supporting disk with its support arms carrying the chain grid can be fixed to the fixing disk using a correspondingly designed locking device. Thus, an antiskid device with the characteristics of a snow chain is provided, which can be fitted in a very short time compared with the often difficult fitting and removal of known snow chains, because the supporting disk with the chain grid is merely mounted on the fixing disk provided on the wheel and locked thereto, the support arms with the chain grid engaging over the tire tread. Thus, the chain grid of the antiskid device does not have to be manually placed over the tire shoulder, because on introducing the supporting arms over the tire tread, said arms take the chain grid with them, so that following the fitting of the supporting disk with the support arms and the chain grid on the fixing disk, the chain grid comes to rest above the vehicle tire tread. Thus, when using this antiskid device, there is no need for the manual drawing of the chain grid over the tire shoulder as in known snow chains. In addition, there is no need to tension the chain or chain grid of the antiskid device, because following the application of the antiskid device, the snow chain always assumes the correct position on the tire. As a result of the antiskid device support arms, the chain grid is to a certain extent held in a floating manner over the tire tread, which obviates any tight engagement of the snow chain on the tire tread, as is the case when snow chains are stretched over a tire, without the necessary force closure between the snow chain and the tire being lost. The chain grid is always in the stretched or tensioned state, because the recovery capacity of the plastic support arms permits the maintainance of the ideal stretched state of the chain grid. Moreover, the antiskid device is also usable for wide-walled tires, it then being necessary for the antiskid device support arms to have a length corresponding to the particular tire used, so that the support arms with the chain grid overlap the tire tread. In addition, in the case of higher travelling speeds, the chain grid is tensioned, because the chain lifts slightly and is drawn on to the tire tread by the weight of the lateral chain portions (side chains).

In addition, the length of the support arms does not have to be dimensioned in such a way that they support arms and chain grid have to engage behind the tire, so that the antiskid device can also be used for tires where chains are not allowed or where chains cannot be employed because of an inadequate gap between the inside of the tire and the parts of the vehicle.

It is easy to fit the antiskid device, because it has an opening between two support arms for the insertion or introduction of the wheel and after fitting the antiskid device, said wheel engagement opening can be closed by means of various chain portion shapes.

As the chain grid is held by the antiskid device support arms at a limited distance above the tire tread, the risk of the chain grid tearing, breaking or fracturing is avoided. This risk of chain break always occurs if the chain is held too firmly on the vehicle tire. In addition, it is also possible to fit the antiskid device in the case of an ice-covered wheel case, because it is merely necessary to have a gap between the upper area of the tire tread and the lower termination of the vehicle mudguard or fender and always exists on motor vehicles. As the chain grid is held by the support arms on the vehicle tire tread, there is no damage to the wheel dish.

The actual snow chain comprises a chain fixed to the free ends of the support arms and chain portions, which are fixed at one end to the first-mentioned chain and at their other end to the support arm, so that a snow chain-like chain grid is obtained.

According to another embodiment of the invention, the snow chain grid chain is guided in the area between two support arms, whilst forming a wheel engagement opening, to the supporting disk and is held in the connection area of the support arms on the supporting disk, the wheel engagement opening between two support arms being closable by means of a chain portion.

In another embodiment of this device with wheel engagement opening, the chain of the snow chain fixed to the free ends of the support arms is constructed in interrupted manner in the area between two support arms for forming the said wheel engagement opening, so that one end of the chain is fixed to one support arm bounding the wheel engagement opening, whilst the chain end fixed to the other support arm is lengthened, the lenghthened chain portion having a length which is greater than the length of the two support arms and the distance between two support arms and is passed through a passage ring at the end of the chain, whereby on the supporting disk adjacent to one of the two support arms bounding the wheel engagement opening, there is a fixing device, such as a hook or the like, for hooking in the free end of the extended portion of the chain.

According to another embodiment of the invention, the chain of the snow chain is constructed in interrupted manner in the vicinity of two support arms laterally bounding a wheel engagement opening and is fixed by its free ends to the free ends of the support arms, the two support arms bounding the wheel engagement opening carrying on their facing longitudinal edges in each case one clip fixed by its ends to the upper and lower zones of the support arm and which is constructed in conically tapering manner from the upper free end to the end facing the supporting disk, the clip being provided with a ring-like portion in the upper area, a chain being displaceably held on the two clips in the longitudinal direction of the support arm, and through the end chain links thereof the two clips are passed through on the two support arms, the chain having a length corresponding roughly to the spacing of the two support arms in their lower zone.

The invention provides for a construction of the wheel engagement opening of the antiskid device in such a way that the outer end of the snow chain having a greater length than the periphery formed by the free ends of the support arms is fixed by its end to the free end of one of the two support arms bounding the wheel engagement opening, the support arm carrying the chain end having a ring-like passage fitting, the other extended end of the chain being passed through the passage fitting and by its end of the extended chain portion can be fixed to the supporting disk by means of a fixing device, such as a tenterhook, bent lever, etc. constructed in per se known manner.

For tensioning the outer chain, the free end of the lengthened chain portion of said outer chain is connected to a spring element, such as a helical spring, rubber band, etc., which is guided on a circular line by guides fixed or shaped on to the supporting disk and is fixed by its free end to the latter. As the antiskid device support arms have a certain elasticity and a corresponding recovery capacity as a result of the plastic used, a tensioning of the outer chain is possible by pulling, so that after fixing the outer chain by its free end to the supporting disk the chain grid of the antiskid device is positioned in the tensioned state of the tire tread above or by means of the support arms, because as a result of the existing recovery capacity the support arms attempt to move back into their initial position from a lateral, displaced position, as a result of the tightening of the chain, so that due to this behaviour of the support arms a firm seating of the snow chain of the antiskid device on the tire is always ensured.

In order to bring the support arms into a position engaging on the supporting disk when the antiskid device is not in use, the support arms are so fixed to the supporting disk or are so constructed that the support arms are bendable or pivotable in the direction of the supporting disk. Thus, in the bent down or pivoted in state, the support arms come to rest on the supporting disk surface, so that the antiskid devices, e.g. for two tires, can be carried in a very small space in the vehicle boot or trunk. In addition, several antiskid devices with fixed support arms can be telescoped into one another and stocked in the very smallest space, or can be housed in a trunk.

Further advantageous developments of the invention can be gathered from the subclaims. The construction of the fixing device for the antiskid device is particularly advantageous, in which for fixing the supporting disk to the wheel disk or rim, a circular fixing disk with a plurality of openings for the rim screws, wheel studs, etc. is provided, which centrally carries a circular hub, as a smaller diameter than the fixing disk, which is provided at a distance from the fixing disk adjacent to the upper end thereof and in its periphery, with a plurality of bead-like shoulders with slideways and guideways formed beneath the same and conically tapering from the inlets in the circumferential direction of the hub, which carry the supporting disk with the support arm surrounding the hub, which is secured by means of a retaining ring mounted on the hub, which has locking webs insertable into the slideways and guideways on the hub and bringing about a bayonet-like locking with conically tapering portions extending to the inlets and having on the inner wall surface thereof at least one leaf spring-like catch, which in the locked position of the retaining ring on the fixing disk engages in a recess on the hub circumference and which is supported on a stop to prevent undesired unlocking, whilst being transferrable by means of an unlocking key from the locking position into an unlocking position, the supporting disk with the support arms being arranged with clearance on the hub of the fixing disk for performing eccentric rotary movements.

By means of a fixing device constructed in this way, it is effortlessly possible to fit the antiskid device, comprising a supporting disk with a plurality of support arms carrying the snow chain and no great strength is required. As the fixing device, comprising the fixing disk and the retaining ring, remains on the wheel rim, for mounting the supporting disk with the support arms it is merely necessary to detach the retaining ring from the fixing disk fixed to the rim, which is followed by the mounting of the supporting disk on the fixing disk hub. By means of the then mounted retaining ring, the supporting disk is locked on the fixing disk in such a way that the supporting disk is held with clearance on the fixing disk hub and between the fixing disk and the retaining ring. As a result of the bayonet-like locking between the fixing disk and the retaining ring, the antiskid device comprising the supporting disk and support arms is reliably held. The release of the locking action is brought about by means of an unlocking key, which has two bends, by means of which the leaf springlike catch can be moved out of its locking position. The fixing disk with the hub and the mounted retaining ring can constantly remain on the vehicle wheel rim, whilst the actual antiskid device, namely the supporting disk, with the support arms carrying the snow chain, can be fitted when required.

It is particularly advantageous to adopt the construction according to which the supporting disk with the support arm carrying the snow chain is placed with clearance on the fixing disk hub. Due to the fact that the supporting disk is held with a relatively large clearance on the fixing disk hub, the supporting disk is able to perform eccentric movements, because said disk with the support arms has to carry out the squeezing movement of the tire during the operation of the antiskid device and must consequently not be fixed or rigidly mounted on the rim. Due to the fact that the supporting disk is held with clearance on the fixing disk hub, the supporting disk can perform tumbling or wobbling movements adapted to the squeezing movements of the tire. This ensures that the antiskid device support arms when in operation always assume a position in which the support arms engage in the tire side walls and overlap the tire tread.

According to another advantageous development of the invention, the antiskid device is provided with a fixing disk connected to the wheel disk or rim, for fixing the supporting disk and said fixing disk is provided with lockable mounting supports for the supporting disk, the fixing disk being non-detachably connected to the wheel disk or rim and forms a component of the wheel. As the fixing disk and the retaining ring remain on the wheel rim in this embodiment, for mounting the supporting disk and support arms is merely necessary to detach the retaining ring from the fixing disk connected to the wheel rim. This is followed by the mounting of the supporting disk on the fixing disk hub. By means of the then mounted retaining ring, the supporting disk is locked on the fixing disk in such a way that the supporting disk is held with clearance on the fixing disk hub and between the fixing disk and the retaining ring.

Furthermore, an antiskid device according to the invention is constructed in such a way that this can be used without great technical expenditure on a plurality of vehicles, whose wheel disks or rims have different bolt circles and pitches for the rim screws or wheel studs, so that there is no need to keep stocks of a large number of differently constructed fixing disks for the individual wheel disk or rim types. This is achieved in that on its side remote from the supporting disk, the fixing disk carries an adaptor disk, which is connected by means of screw connections to the fixing disk hub, and which has a plurality of radially directed oblong holes identical and/or non-identical or a plurality of pitches.

The advantage of using an adaptor disk on the fixing disk provided with the hub is that only a single fixing disk design is required. The adaptor disk has tapped holes corresponding with the fixing disk bores in the fixing disk hub and also a plurality of oblong holes, which are constructed radially in the same or several pitches in the adaptor disk, so that as a result of the large number of oblong holes provided in the adaptor disk, the fixing disk can be fixed by means of the adaptor disk to the wheel disk or rim, because the large number of differently arranged oblong holes gives possibility of adaptation to the different tapped holes for the rim screws or wheel studs provided on wheel disks or rims. Thus, there is no need to keep stocks of large numbers of fixing disks for such antiskid devices, because through the provision of the oblong holes in the same or a plurality of pitches in the adaptor disk, there is an adaptability to wheel disks or rims with different associations and arrangements of tapped holes for receiving the rim screws or wheel studs. The adaptor disk is merely screwed in self-centering manner, and with the correct pitch or spacing on the rim screws, wheel studs or special wheel screws, with different pitch circle diameters. The fixing disk with the hub is then fixed by screw connections to the adaptor disk, so that the antiskid device can be used for vehicles for whose bolt circles and pitches there are no fixing disks with hubs.

BRIEF DESCRIPTION OF THE DRAWINGS

The invention is described in greater detail hereinafter relative to non-limitative embodiments and the attached drawings, wherein show:

FIG. 15 a side view of the fixing disk.

FIG. 16 a closure area on the fixing disk.

FIG. 18 a plan view of an unlocking key.

FIG. 19 a front view of the unlocking key.

DETAILED DESCRIPTION OF THE PREFERRED EMBODIMENTS

Figure 11:
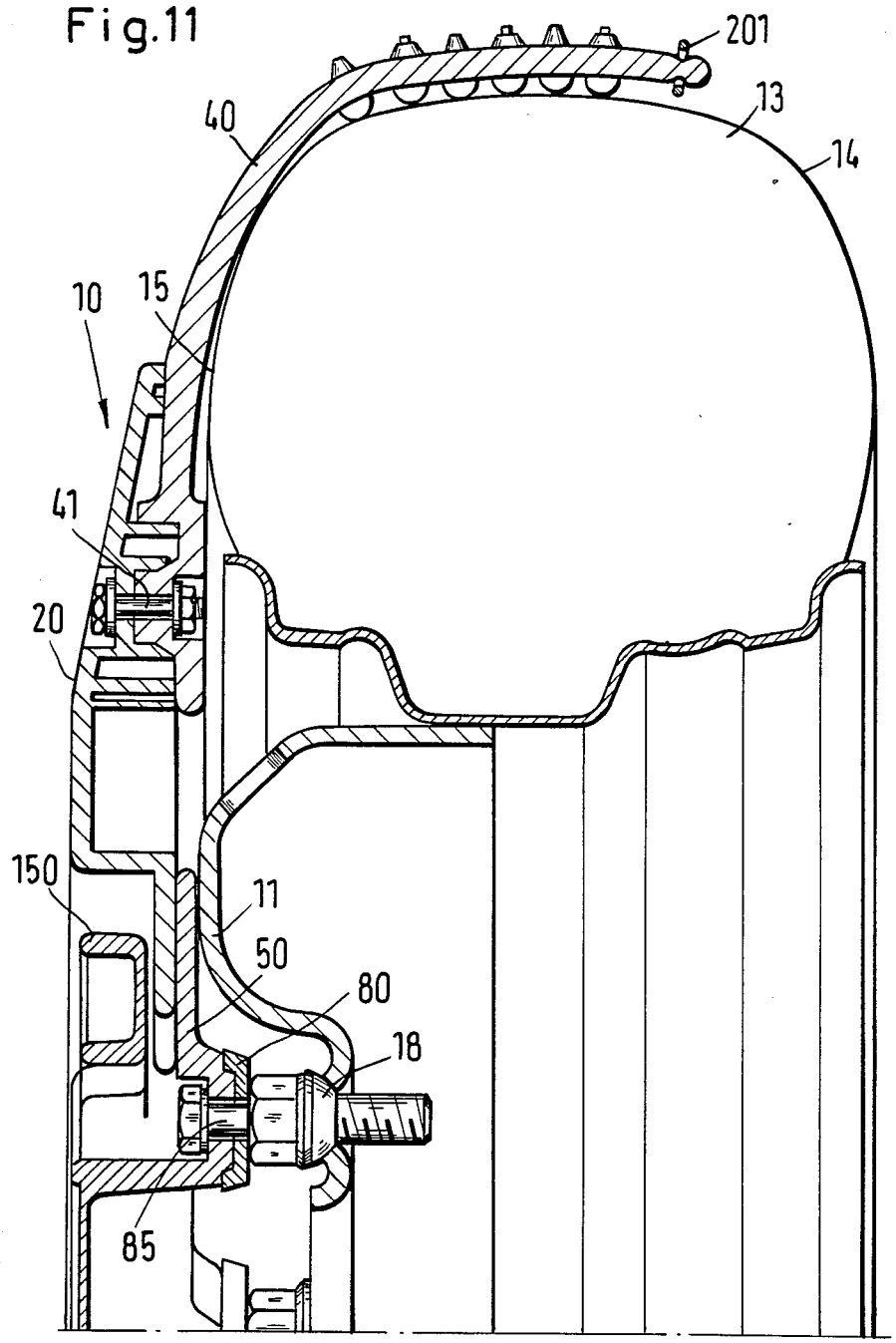
FIG. 11 a part vertical section of a vehicle wheel, with antiskid device support arms overlapping the tire tread.
Figure 12:
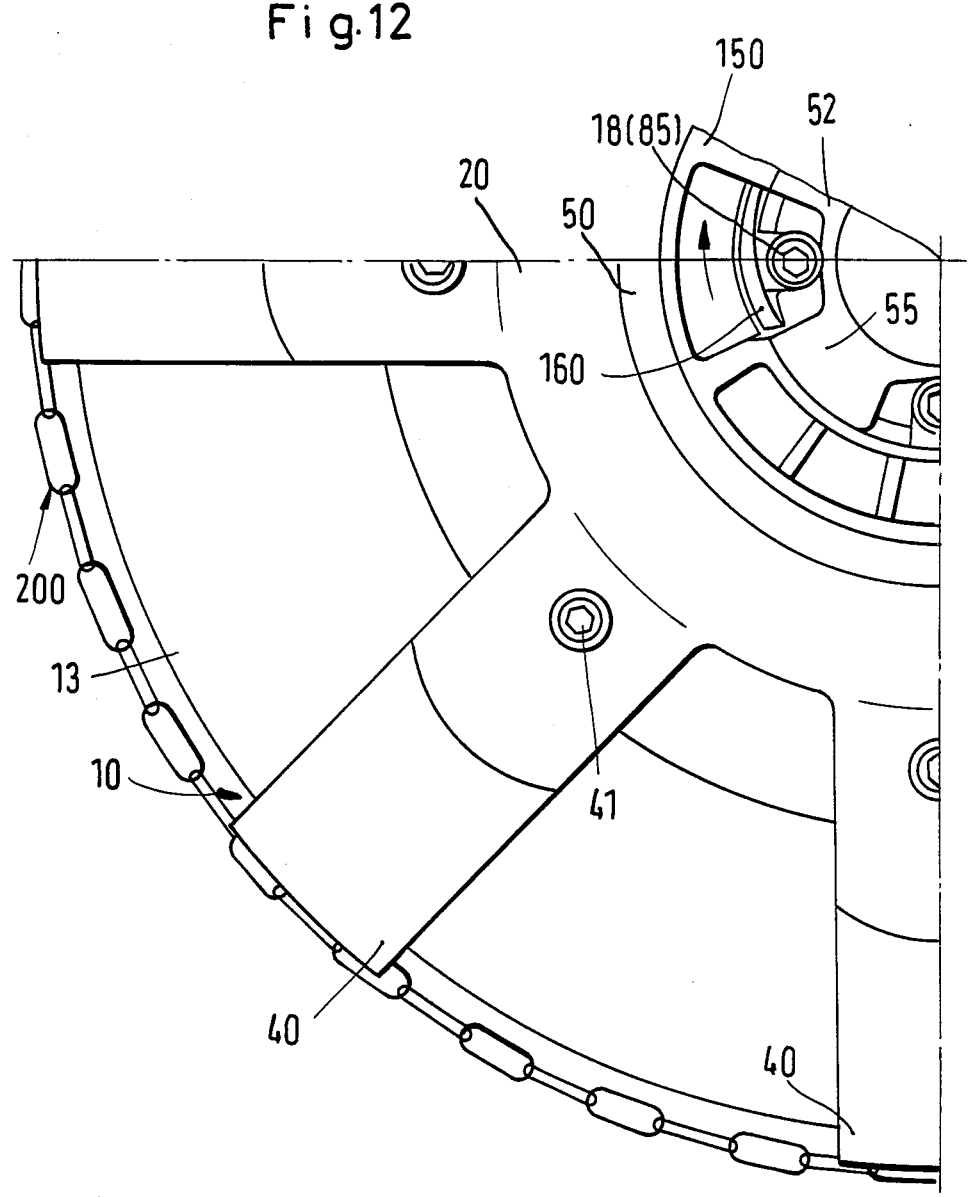
FIG. 12 a plan view of a portion of the antiskid device supporting disk carrying the support arms.

As shown in FIGS. 11 and 12, antiskid device 10 comprises a circular supporting disk 20 provided with a central opening, to which is fixed a plurality of radially directed support arms 40, which are equidistantly arranged and are pivotable in a small range about axes 41 running parallel to the wheel disk bearing axis. However, the support arms 40 can also be fixed to the supporting disk 20. The pivotability of support arms 40 in a small range makes it possible to fit the antiskid device when the vehicle is stationary. During the first revolutions of the vehicle wheel, all the support arms assume an equidistantly spaced position, even if during the fitting of the antiskid device the support arms come to rest laterally with respect to the tread bearing surface on a substrate, such as a road or the like.

The support arms are made from metallic materials or other suitable materials, but can also be made from plastics. If the support arms 40 are fixed to the supporting disk 20 and are made from plastics having a certain resilient-elastic and in particular recovery capacity, then the support arms located in the vicinity of the wheel bearing surface can bend out laterally, so that they come to rest on the tire in the vicinity of the tire bearing surface, consequently on starting up the vehicle said arms assume their correct radial position, which is brought about through the existing recovery capacity of the plastics used for producing the support arm.

The antiskid device is fixed to the wheel provided with a tire 13, and which simultaneously constitutes the rim. Wheel 11 is provided with a brake part not shown in the drawing. The tread area of the tire 13 is designated 14 and the outside surface thereof is designated 15 (FIG. 11).

Figure 1:
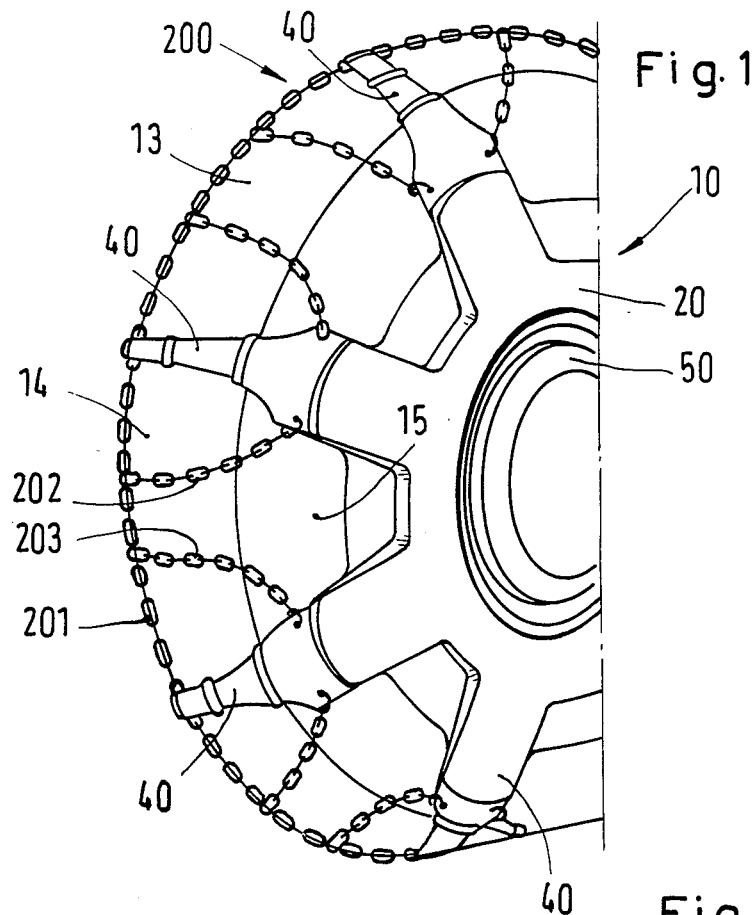
FIG. 1 a diagrammatic view of an antiskid device having a chain grid as the snow chain in the state fitted to a vehicle tire.
Figure 2:
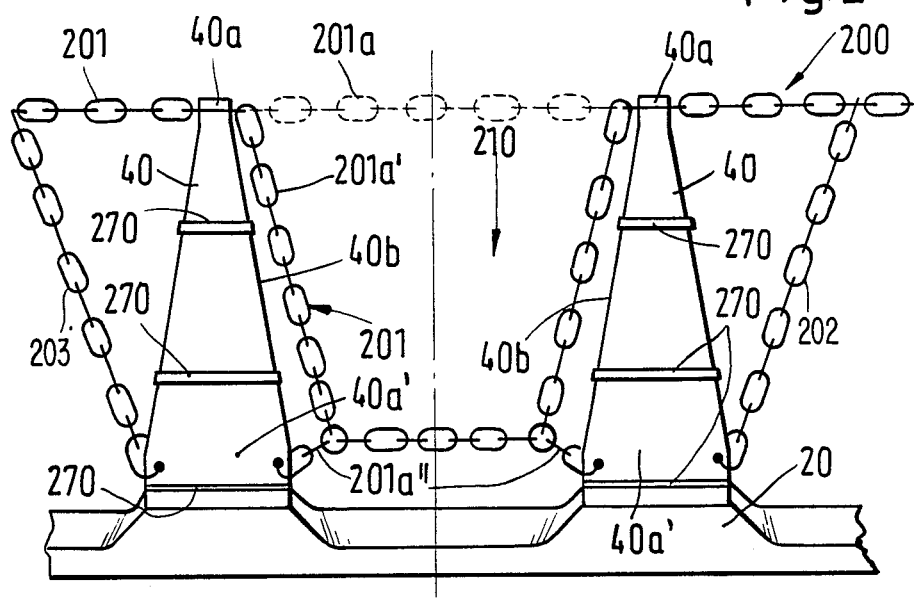
FIG. 2 a plan view of two support arms of the antiskid device with snow chain guide.

According to FIGS. 1 and 2, support arms 40 carry a snow chain 200, which is formed by a chain grid, which comprises an outer chain 201 fixed to the free ends 40a of the support arms 40 and further chain portions 202, 203, fixed by one end to chain 201 and by the other ends to support arms 40, so that e.g. a ladder chain-like chain grid is obtained (FIG. 1). However, the chain portions 202, 203 can also be so arranged that chain grids are obtained, which correspond to zig-zag chains, revolving zig-zag chains, channel cross chains or asymmetrical channel cross chains; it also being possible to use chain grids with different configurations.

If chain 201 is constructed in an endless manner, then all the support arms 40 of the antiskid device are connected by means of said chain 201 and namely also the area between the two support arms 40, which serves as an opening for introducing the tire when fitting the antiskid device. This wheel engagement opening is shown at 210 in FIG. 2. In this construction, the chain grid of the antiskid device snow chain 200, the two support arms bounding the wheel engagement opening 210 are interconnected in the same way as all the support arms by the individual portions of chain 201. This chain portion is 201a in FIG. 2, and connects the two support arms 40 bounding the wheel engagement opening 210.

Chain 201 can also be constructed endlessly in another way, and then, in accordance with the embodiment of FIG. 2, the chain 201 is guided in the vicinity of the two support arms bounding the wheel engagement opening 210 with a portion 201a' on the facing longitudinal edges 40b of the two support arms 40 and in the vicinity of supporting disk 20, as shown in FIG. 2. In the connection area of the two support arms 40 to the supporting disk 20, the chain portion 201a' of chain 201 is fixed by means of chain links 201'', to the base areas 40a' of the two support arms. Even when the antiskid device is fitted, the chain portion 201a' of the outer chain 201 of snow chain 200 of the antiskid device remains in the position shown in FIG. 2.

As a result of this guidance of chain 201 with its chain portion 201a, a wheel engagement opening 210 is obtained, which makes it possible with the vehicle stationary and without any need to move the latter, to fit the antiskid device, because in the vicinity of the wheel base chain portion 201a' cannot otherwise be brought over the tire tread, but this is not necessary because on starting the vehicle the support arms 40 are radially oriented and tension the complete chain grid, so that after fitting the antiskid device, the previously formed wheel engagement opening 210 does not have to be closed, as is indicated in FIG. 2 with chain portion 201a.

Figure 3:
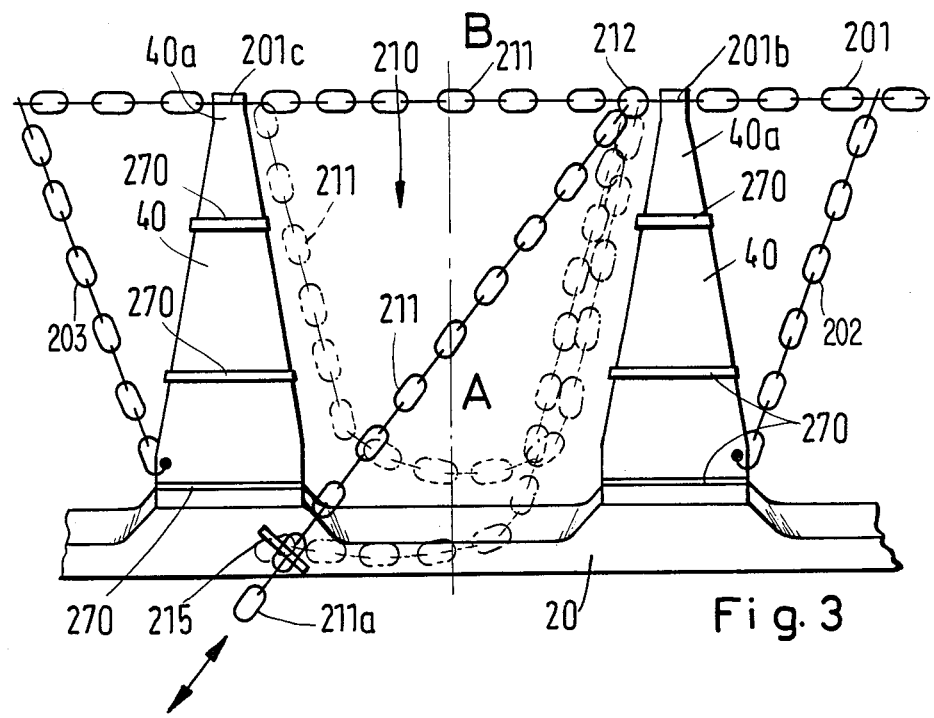
FIG. 3 a plan view of another embodiment of a chain guide for the antiskid device between two support arms thereof forming a wheel engagement opening.

For forming a wheel engagement opening 210, according to FIG. 3, the outer chain 201 of snow chain 200 fixed to the free end 40a of support arms 40 is interrupted in the area between two support arms 40, so that one end 201b of chain 201 is fixed to one of the two support arms 40 bounding the wheel engagement opening 210, whilst the end 201c of chain 201 fixed to the other support arm 40 is fixed with a chain ring to the free end 40a of support arm 40, but is constructed in a lengthened or extended form. The lengthened chain portion 211 has a length greater than the length of two support arms 40 and the distance between them. In addition, said lengthened chain portion 211 is passed through a passage ring 212 at end 201b of chain 201. Adjacent to one of the two support arms 40 bounding the wheel engagement opening 210 on supporting disk 20, a fixing device 215 is provided, which is constructed in per se known manner, e.g. as a hook-like bent lever and is used for hooking the free end 211a on the extended chain portion 211 of chain 201. During the fitting of the antiskid device of a vehicle wheel, chain portion 211 assumes the position shown at A in FIG. 3, so that opening 210 is constructed for the fitting and engagement of the tire not shown in the drawing. When the antiskid device is fitted and the support arms 40 overlap with their chain grid the tire tread, chain portion 211 and consequently chain 201 is tensioned until chain portion 211 assumes position B in FIG. 3.

If the antiskid device has a closed chain 201, then the said device is fitted in such a way that on fitting supporting disk 20 with support arms 40, the latter with the chain grid thereof are engaged over the upper region of the tire. The vehicle is then moved by half a wheel revolution, and the remaining antiskid device portion with its support arms and chain grid is engaged over the tire, followed by locking. However, if the antiskid device has the possibility of the construction of a wheel engagement opening according to FIG. 3, then there is no need to move the vehicle for fitting the antiskid device, because the tire in the vicinity of its base fits into the approximately U-shaped wheel engagement opening 210.

Figure 4:
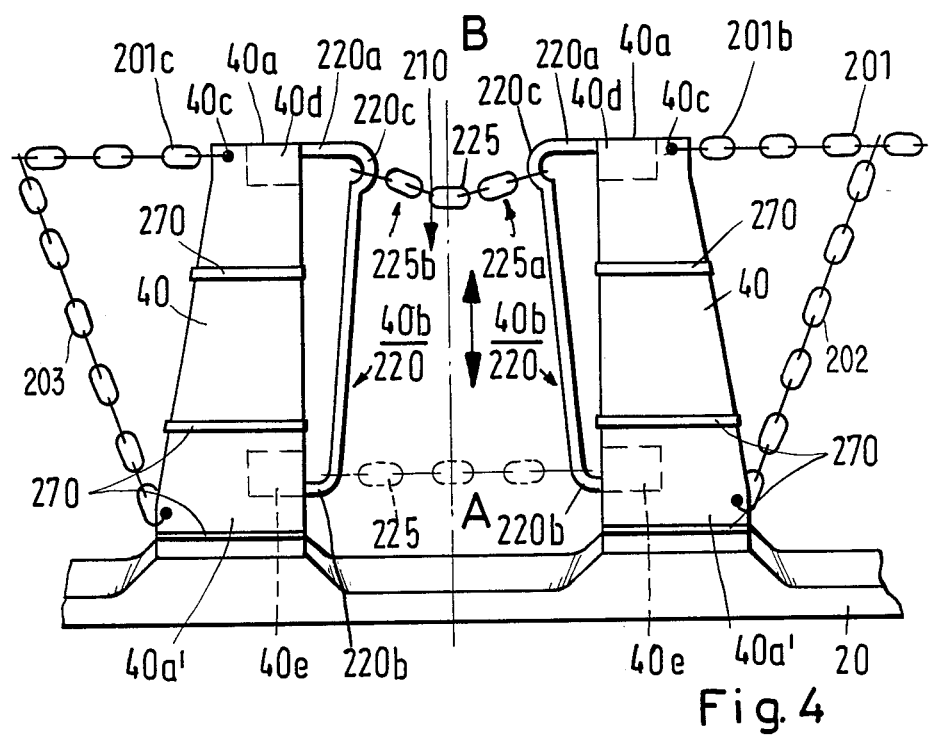
FIG. 4 a plan view of another embodiment of a snow chain guide between two antiskid device support arms, using two guide clips and a chain portion displaceable in the longitudinal direction of the support arm for forming a wheel engagement opening.

The formation of a wheel engagement opening 210 is also possible with the embodiment shown in FIG. 4, where chain 201 of snow chain 200 is constructed in interrupted manner in the vicinity of two support arms 40 laterally bounding the wheel engagement opening 210. The free ends 210b, 201c of chain 201 are fixed to the free ends 40a of the two support arms 40. The two support arms laterally bounding the wheel engagement opening 210 are provided on their facing longitudinal edges 40b with in each case one clip 220 fixed by its ends 220a, 220b in the upper and lower zones of support arm 40 and 40d, 40e. The two clips 220 are constructed identically. The arrangement and construction of these two clips 220 on support arms 40 is such that the clips conically taper from the upper free ends 40a on support arms 40, to the ends 40a' of the support arms facing supporting disk 20 and as shown in FIG. 4. In the upper zone, each clip 220 has a ring-like portion 220c and said portions 220c of the two clips 220 face one another. A chain 225 is displaceably held in the longitudinal direction of the support arm on the two clips 220. For this purpose, clips 220 are passed through the end chain links 225a, 225b of chain 225, which has a length, which roughly corresponds to the spacing of the two support arms 40 in their lower zone 40a'.

In order to release opening 210 for the engagement of the tire, chain 225 is moved to such an extent in the direction of supporting disk 20 on the two clips 220 that chain 225 assumes position A. The wheel engagement opening 210 is then made free, so that the antiskid device can be fitted to the tire, without vehicle having to be moved for fitting said device. When the antiskid device is fitted to the vehicle tire, then chain 225 is moved from position A into position B, so that chain 225 is held in the ring-like portions 220c of the two clips 220. However, it is not necessary to manually move chain 225 into closure position B. If, following the fitting of the antiskid device, chain 225 remains in position A, then chain 225 moves automatically on clips 220 on starting up the vehicle, so that the outer chain 201 is closed in the vicinity of wheel engagement opening 210 by means of chain 225.

If chain 201 is constructed in an interrupted manner for forming a wheel engagement opening 210 and for closing said opening 210, the chain is closed after the fitting of the antiskid device by means of the chain portion 211 in accordance with the embodiment of FIG. 3, then it is possible to automatically tension chain portion 211 and consequently chain 201. For this purpose, according to FIG. 5, chain 201 which has a greater length than the periphery formed by the free ends 40a of support arms 40 fitted by its end 201b to the free end 40a of one of the two support arms bounding the wheel engagement opening 210, whilst the support arm 40 carrying chain end 201b has a ring-like passage fitting 212, through which is passed the other end or end portion 211 of chain 201. End 211a of the lengthend chain portion 211 of chain 201 is then fixed by means of a fixing device 215a constructed in per se known manner, to the supporting disk 20, said fixing device 215a being constructable as a tenterhook, bent lever closure, etc., so that independently of a fixing of chain portion 211 on supporting disk 20, it is still possible to tension chain 201 and its chain portion 211. In this case the fixing device 215a is constructed as a clamping device and comes into action in addition to correspondingly constructed tensioning elements.

Figure 5:
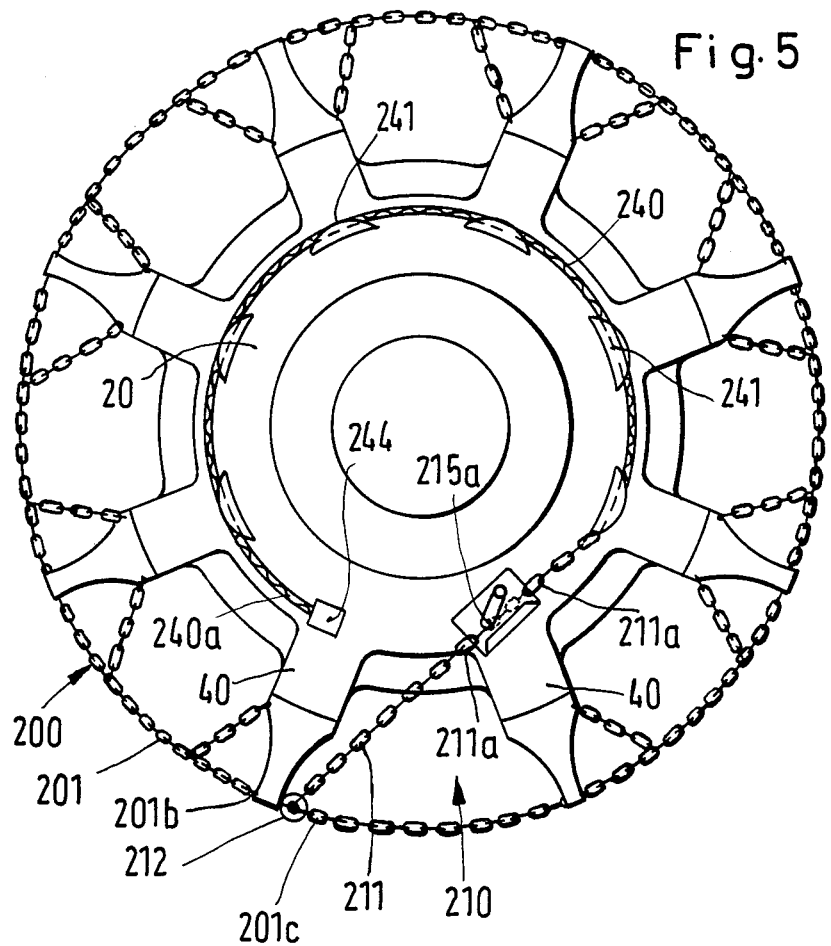
FIG. 5 a plan view of a vehicle tire with fitted antiskid device and a mechanism tensioning the outer chain of the snow chain held by the support arms.

For the tensioning of chain 201 or chain portion 211, chain end 211a of the lengthened chain portion 211 of chain 201 is connected to an elastic or spring tensioning means in the form of a spring element 240, which can be constructed as a helical spring, rubber band or the like. This spring element 240 is guided by guides 241 arranged on a circular line and fixed or shaped on to supporting disk 20, and is fixed by its free end 240a to supporting disk 20 at 244. The guides 241 for receiving the spring element 240 are constructed as arcuate shaped members with a reception slot or groove for the spring element so that a lateral sliding of the spring element 240 from guides 241 is avoided (FIG. 5). The fixing device 215a then merely serves to additionally fix chain 201 or its chain portion 211 to supporting disk 20. If chain 201 with its chain portion 211 is manually tensioned without using a spring element 240, then the fixing device 215a maintains chain 201 and its chain portion 211 in the given tensioned position. The fixing device 215a for chain 201 can be a curry or comb clip on supporting disk 20.

Figure 6:
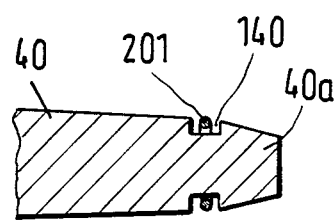
FIG. 6 a larger-scale vertical section of the end of a support arm with fitted, outer chains of the antiskid device chain grid.

The outer chain 201 of snow chain 200 fixed to support arms 40 is fixed to the free ends 40a of said support arms. To this end, each support arm is provided on its free end 40a with an annular groove 140 for receiving and maintaining the annular link of chain 201 of snow chain 200 (FIG. 6). In the embodiment shown in FIG. 6, each support arm 40 is provided at its free end 40a in the vicinity of its two longitudinal edges 40b with recesses 141, which are used for receiving and holding the annular link of chain 201 of snow chain 200. However, it is also possible to provide differently constructed fixing devices on support arm 40 for receiving and holding chain 201 of snow chain 200. Support arms 40 are detachably or indetachably fixed to the supporting disk 20.

In order to be able to house the antiskid device comprising supporting disk 20 with its support arms 40 and the chain grid of snow chain 200 in the smallest possible area, e.g. in a boot or trunk, each support arm 40 is so fixed to the supporting disk 20 that the supporting arms are bendable or pivotable in the direction of the supporting disk.

Figure 8:
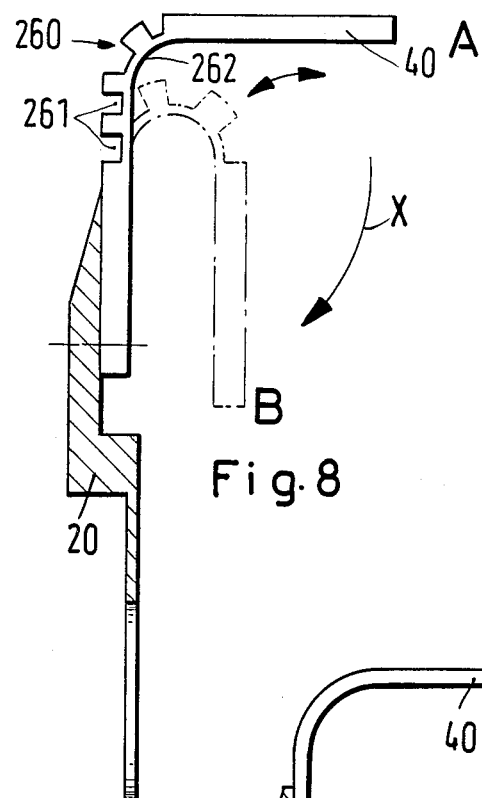
FIG. 8 partly in elevation, partly in vertical section, support arm fixed to the supporting disk and provided with a strap hinge-like portion in the operating position and in the swung in position.

According to the embodiment of FIG. 8, support arm 40 is provided with a portion having notches or the like 261 for forming a strap hinge 260 adjacent to its fixing zone to supporting disk 20, so that as a result of this strap hinge-like construction of support arm portion 262, support arms 40 can be applied to the supporting disk 20 from operating position A in FIG. 8 by pivoting in the direction of arrow X. This position of support arm 40 is indicated at B. For retaining the thus pivoted in support arm 40, a device not shown in the drawing can be provided, enabling the pivoted in support arm 40 to be held in position B. This securing device can e.g. be a rubber band or the like. Through the possibility of pivoting in the support arms 40, it is possible to house the antiskid device in space-saving manner.

Figure 9:
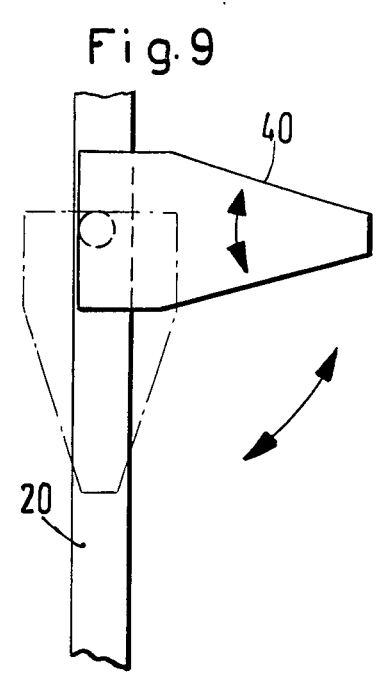
FIG. 9 an inwardly and outwardly swingable and rotatable support arm in the swung in and out position.

However, each support arm 40 of supporting disk 20 can be held in insertable manner on the said disk, support arm 40 also being rotatably and pivotably held thereon, so that it is possible to hinge and apply support arms 40 to supporting disk 20 (FIG. 9).

Figure 10:
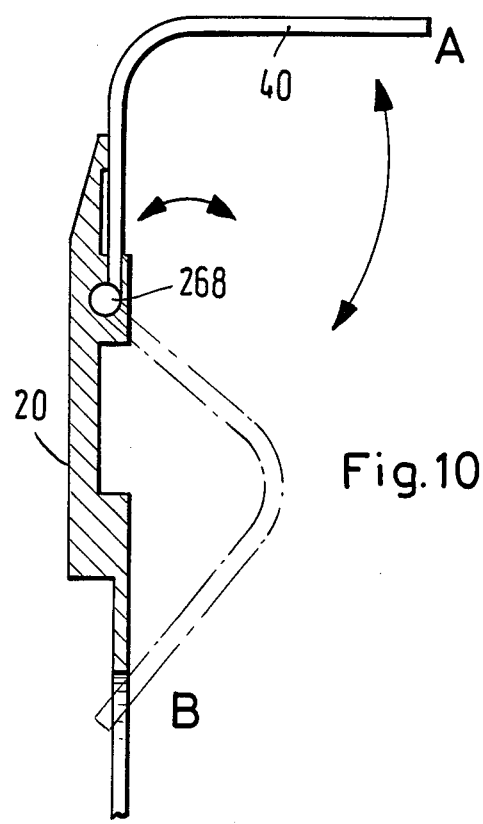
FIG. 10 partly in elevation and partly in vertical section, a further embodiment of an inwardly and outwardly rotatable support arm articulated to the antiskid device supporting disk.

In the embodiment shown in FIG. 10 the prebent support arm 40 is ariculated at 268 to supporting disk 20, which provides the possibility of pivoting support arm 40 from operating position A into position B for engaging on supporting disk 20. In the case of this embodiment, a space-saving housing of the antiskid device in a trunk is once again possible, because in the pivoted in state of all the support arms 40, the antiskid device only has a limited height. In order to be able to hold support arms 40 in operating position A, a not shown locking device is provided on supporting disk 20 for each support arm 40 and can e.g. comprise a locking bolt or the like, so that the support arms 40 can be kept in a pivoted out position A.

Each support arm 40 is fixed to the supporting disk 20 by means of bolt-like or rivet-like connecting means, a detachable fixing of the support arms 40 to the supporting disk 20 also being possible, so that worn arms 40 can be replaced by new arms. As shown in FIG. 12, there are eight support arms 40 and supporting disk 20, but the number of arms can be chosen at random. The number of support arms of supporting disk 20 is also dependent on the size of the antiskid device and the tire for which the latter is intended. All the support arms 40 have the same angular distance. Each support arm 40 carrying the chain grid or snow chain 200 is made from resilient-elastic material, such as e.g. a suitable plastic or spring steel, so that an elastic downward bending of the free end portion of each support arm 40 is possible in the vicinity of tread 14 of tire 13. The support arms 40 are preshaped in such a way that after fitting the antiskid device 10 to a vehicle wheel, the free ends of the support arms engage over the tread 14 (FIG. 1).

At the free ends, support arms 40 can outwardly be provided with gripping profiles, so that the grip of the antiskid device can be improved by means of the chain grid of snow chain 200. These gripping profiles can also be constructed as spikes or provided with spikes.

Figure 13:
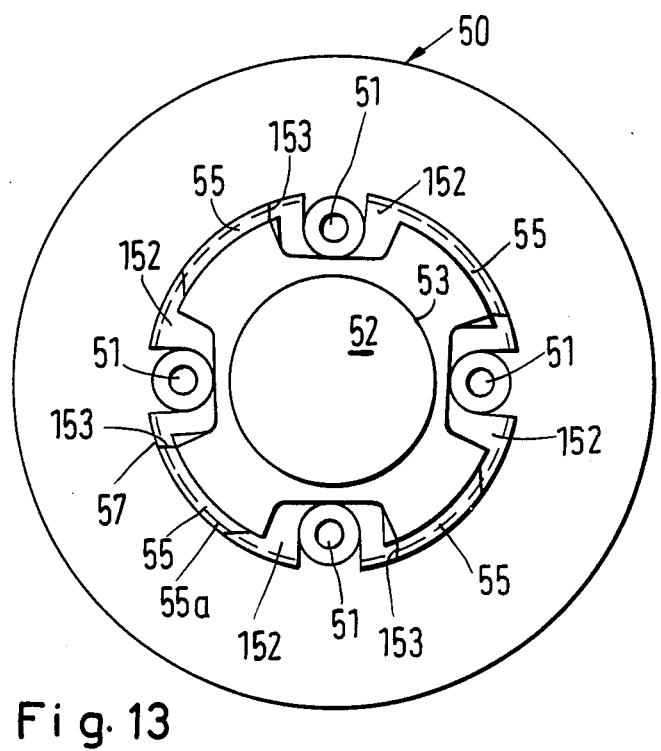
FIG. 13 a plan view of the fixing disk with the fixing device hub for the antiskid device.
Figure 17:
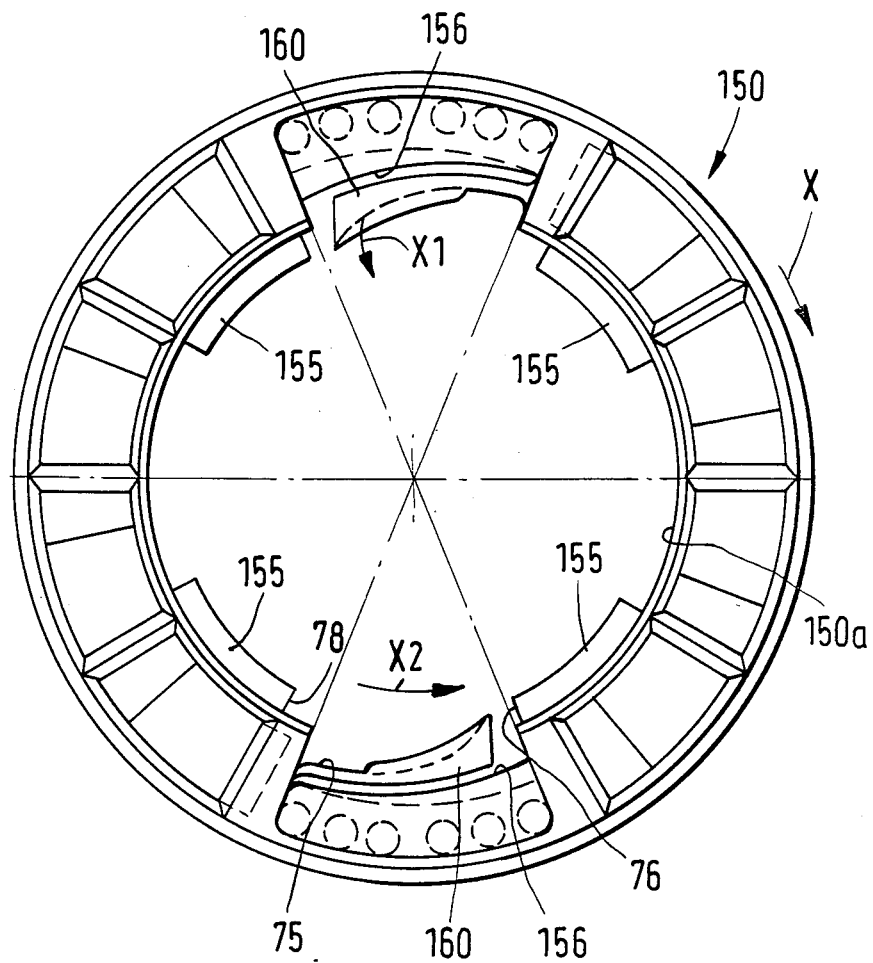
FIG. 17 a plan view of the retaining ring of the fixing device for the antiskid device.

The fixing device for the antiskid device 10 to the rim of a vehicle wheel comprises a hublike fixing disk 50 and a retaining ring 150 (FIGS. 13 and 17). According to another embodiment, the fixing disk 50 is an integral part of the vehicle wheel. The wheel and fixing disk 50 then form a rolled or moulded member.

The fixing disk 50 is provided with a plurality of openings 51, which are used for passing through rim screws, wheel studs, etc. 18. As shown in FIG. 11, the rim screws or wheel studs 18 for fixing the fixing disk 50 are provided with internally threaded bores for receiving securing screws 85, by means of which the fixing disk 50 can be fixed to the wheel rim 11.

The circular fixing disk 50 is centrally provided with a cross-sectionally circular hub 52 formed as a mounting part, which is constructed as a cylindrical shaped or moulded body and forms an integral part of the fixing disk 50. The diameter of hub 52 is smaller than the diameter of fixing disk 50.

On its outer circumference and adjacent to edge 53, hub 52 is provided with a plurality of bead-like shoulders 55, which are equidistantly spaced. In the embodiment of FIG. 13, there are four bead-like shoulders 55 projecting laterally from the hub circumference on hub 52 of fixing disk 50.

A slideway and guideway 60 is formed beneath each bead-like shoulder 55. Slideway and guideway 60 is constructed as a recess and is provided with an inlet 56, which tapers conically from way 60 to the end region, so that the inlet 56 is larger than end region 56a. The recess forming the guideway and slideway 60 then has a wedge-like configuration, and is bounded by a torus 57 in the area adjacent to fixing disk 50. The end region 56a of slideway and guideway 60 also has a boundary in the form of a stop, which need not be present.

Torus 57 shaped on to the outer circumference of hub 52 simultaneously constitutes an upper limitation for the supporting disk 20 mounted on hub 52 of fixing disk 50 (FIG. 13). In the vicinity of openings 51, said torus 57 is interrupted, because a portion of each opening 51 passes as a partial bore into hub 52 (FIG. 13).

All slideways and guideways 60 below the bead-like shoulders 55 are so constructed and arranged that their inlets 56 face the in each case preceding end region 56a. Each bead-like shoulder 55 is advantageously provided in its upper area with a flattened portion 55a, which facilitates the mounting of retaining ring 150. Hub 52 of fixing disk 50 serves to receive the supporting disk 20 with support arms 40 of antiskid device 10 and for receiving the retaining ring 150.

Retaining ring 150 secures the supporting disk 20 of the antiskid device 10 mounted on fixing disk 50. The external diameter of the retaining ring 150 is slightly smaller or identical to that of fixing disk 50 and is provided on its inner wall surface 150a with a plurality of locking webs 155, whose number corresponds to that of the bead-like shoulders 55 or the number of the slideways and guideways 60 on hub 52 of fixing disk 50. These locking webs 155 are constructed in such a way that they can be introduced into the slideways and guideways 60, so that there is a bayonet-like locking between retaining ring 150 and hub 52 or fixing disk 50 (FIG. 17).

The locking webs 155 are then wedge-shaped, so that with the retaining ring 150 mounted on the fixing disk 50, the conically tapering end portions of each locking web 155 faces the inlet 56 of the recess forming the slidways and guideways between the bead-like shoulder 55 and torus 57, so that on turning the retaining ring 150 about its vertical median axis, in the direction of arrow X, locking webs 155 are inserted in ways 60 and consequently the bayonet closure-like locking effect is obtained (FIGS. 16 and 17).

To be able to mount the retaining ring 150 on hub 52 of fixing disk 50, so that the locking webs 155 of ring 150 can be introduced into the slideways and guideways 60, webs 155 have a length corresponding to the distance between two bead-like shoulders 55 on fixing disk 50. Thus, in the mounting position of retaining ring 150, the locking webs 155 can be passed through two bead-like shoulders 255, until the retaining ring 150 comes to rest on torus 57 and the locking webs 155 can be introduced into the recesses forming ways 60.

To avoid an automatic release of retaining ring 150 from hub 52 or fixing disk 50, the retaining ring 150 is provided with additional locking means, which are constructed as leaf spring-lie catches 160, in the form of resilient-elastic tongues arranged in recesses 156 on the inner wall surface 150a of retaining ring 150. The arrangement and construction of said leaf spring-like catches 160 are such that when retaining ring 150 is mounted on hub 52 of fixing disk 50, but is still in the unlocked position, the leaf spring-like catches 160 are forced back by the bead-like shoulders 55 on hub 52 into their recess 156 on the inner wall surface 150a of retaining ring 150. If the latter is locked by turning it, then the leaf spring-like catches 160 come to rest in the vicinity of recesses 152 formed on the circumference of hub 52. As the leaf spring-like catches 160 attempt to automatically spring out of their recesses 156 in the direction of arrow X1, said catches 160 come to rest in recesses 152 of hub 52 and there form the locking system, in that the free ends of catches 160 are placed on stops 153, which bound the recess 152 in hub 52. The free ends of the leaf spring like catches 160 engaging in said recesses with stops 153 consequently prevent the release of retaining ring 150 counter to its rotation direction for locking purposes so that it can rise from hub 52.

The number of leaf spring-like catches 160 on the inner wall surfaces 150a of retaining ring 150 can be chosen at random. In the embodiment of FIG. 17, there are two leaf spring-like catches 160, which are equidistantly arranged from the inner wall surface 150a of retaining ring 150. The number of recesses 152 in the circumference of hub 52 of fixing disk 50 corresponds to the number of leaf spring-like catches 160. When manufacturing the retaining ring 150, the catches 160 are simultaneously shaped therewith. The retaining ring 150 made from plastics with a resilient-elastic behaviour in the case of tongue-like design, as applies with respect to the leaf spring-like catches 160.

In place of the leaf spring-like catches 160, it is also possible to use differently constructed locking means. Thus, e.g. it is possible to use radially displaceable or spring-operated bolts, which engage in corresponding recesses on the circumference of hub 52 of fixing disk 50, but then precautions must be taken to bring about unlocking if the locking bolts have to be drawn back into their initial position to enable the retaining rings 150 be removed from the fixing disk 50.

Figure 7:
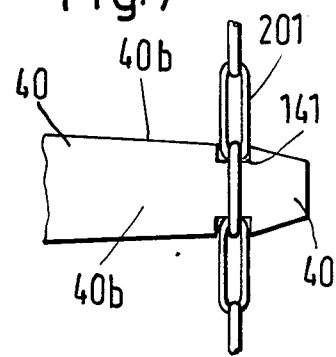
FIG. 7 a large-scale plan view of another embodiment of fixing the outer chain of the antiskid device chain grid to the support arm end.

To be able to remove retaining ring 150 from fixing disk 50, it is necessary to transfer the leaf spring-like catches 160 from their locking position into their initial position in recesses 156 on the inner wall surface 150a of retaining ring 150. For this purpose the unlocking key 70 shown in FIGS. 18 and 19 is provided, and this is constituted by a grip-like handle 71, which carries on its free end two spaced pressure tongues 72, 73, which are arranged in approximately vertically standing manner with respect to the grip-like handle 71. The distance between these two pressure tongues 72, 73 corresponds to the spacing of the facing leaf spring-like catches 160, so that the pressure tongues 72, 73 can be inserted in the two recesses 152 on hub 52. Thus, according to FIG. 7, the two recesses 152 on hub 52 have additional recesses 75, into which can be introduced the two pressure tongues 72, 73 of the unlocking key 70.

If the pressure tongues 72, 73 of the unlocking key 70 are introduced into said recesses 75, and the said key 70 is pivoted in the direction of arrow X2 (FIG. 17) then the two catches 160 which come to rest in recesses 152 of hub 52 are forced out of these recesses and moved into recesses 156 of inner wall surface 150a of retaining ring 150. The leaf spring-like catches 160 are inserted to such an extent that recesses 156, that in the end region of the movement path of the two pressure tongues 72, 73 a stop 76 is freed and the two tongues 72, 73 are applied thereto. If the pressure tongues 72, 73 engage against said stop 76 and the unlocking key 70 is further turned in the direction of arrow X2, then the tongues 72, 73 move retaining ring 150 with them and on further rotation of the locking webs 155 move out of the slideways and guideways 60 of fixing disk 50 up to the locking webs 155 between the bead-like shoulders 55, so that in this position retaining ring 150 can be removed from hub 52.

The mounting of retaining ring 150 on hub 52 also takes place by means of the unlocking key 70, in such a way that the pressure tongues 72, 73 of key 70 are introduced into recesses 75 and on turning key 70 in the direction of arrow X (FIG. 17), tongues 72, 73 move the retaining ring 150 with them until the locking webs 155 come to rest in the slideways and guideways 60, and the bayonet locking effect is obtained. In the fixing region of the leaf spring-like catches 160, recesses 75 have stops 78 for the movement of the retaining ring 150 by pressure tongues 72, 73 of unlocking key 70 (FIG. 17).

As is shown in FIG. 11, on its wall surface 40a remote from hub 52 fixing disk 50 is provided with spacing rings 80 in the vicinity of the rim screw or wheel stud openings 51 and they are constructed as interchangeable adaptors. This provides the possibility of being able to adapt the fixing device to the tire sizes by spacing rings 80 of different sizes.

The fixing of the antiskid device 10 using the supporting disk 20 with the support arms 40 and the chain grid of snow chain 200 fixed thereto, to the rim or wheel 11 of a vehicle using the fixing device comprising the fixing disk 50 of retaining ring 150 takes place in such a way that after fixing the fixing disk 50 by means of rim screws, wheel studs, 18 to the rim 11, the supporting disk of antiskid device 10 is mounted on the hub 52 of fixing disk 50. The retaining ring 150 is them mounted so that its locking webs 155 are positioned in the gaps between the bead-like shoulders 55 on hub 52. This is followed by the insertion of the pressure tongues 72, 73 of unlocking key 70 into recesses 75 and the subsequent pivoting of key 70 in the direction of arrow X (FIG. 15), so that the retaining ring 150 is pivoted about its vertical median axis until the locking webs 155 come to rest on the inner wall surface 150a of the retaining ring 150 in the recesses forming the slideways and guideways 60. Simultaneously, the leaf spring-like catches 160 are locked in self-sprung manner in recesses 152 on hub 52, so that locking takes place so as to prevent unintentional detachment of retaining ring 150. Due to the fact that the free ends of the leaf spring-like catches 160 come to rest in the stop-like recesses 153, a reliable locking effect is ensured. Due to the fact that the said stop recesses 153 are constructed in undercut manner, and the free ends of the leaf spring-like catches 160 have a wedge-like configuration, it is ensured that the free ends of catches 160 can spring out of the said stop recesses 153.

Thus, the antiskid device 10 is held on the vehicle wheel rim 11 by means of the fixing device comprising fixing disk 50 and retaining ring 150, in such a way that the support arms 40 with the snow chain 200 of antiskid device 10 engage over the tire tread (FIGS. 1 and 5).

The removal of the antiskid device 10 takes place with the aid of unlocking key 70, which for this purpose is inserted by its pressure tongues 72, 73 into recesses 75. By pivoting the unlocking key 70, the leaf spring-like catches 160 are moved out of their locking position into their initial position into the recesses 156 on the inner wall surface 150a of retaining ring 150. Simultaneously the retaining ring 150 is turned until the locking webs 155 of retaining ring 150 are passed out of the slideways and guideways 60 on hub 52, so that retaining ring 150 can be removed. This is followed by the removal of supporting disk 20 of antiskid device 10, from hub 52 of fixing disk 50. In the case of further nonuse of antiskid device 10, but on keeping ready the fixing device, the retaining ring 150 is merely mounted and locked on fixing disk 50, so that at any time it is possible to fit the antiskid device 10, should this be necessary.

The supporting disk 20 of the antiskid device 10 is provided with a central opening, so that the supporting disk 20 is mounted on hub 52 of fixing disk 50. The diameter of this central opening is larger than the diameter of hub 52, so that the supporting disk 20 of antiskid device 10 held on hub 52 can perform eccentric movements. This makes it possible for the support arms 40 engaging round the tire tread, in conjunction with the supporting disk 20, to adapt to the pressing or squeezing movements of the moving tire. In the same way, the chain grid of the snow chain 200 of the antiskid device adapts to the squeezing movements of the moving tire, because the chain grid is carried by the support arms and is held in the vicinity of the tire tread. In addition, the diameter of the central opening in the supporting disk 20 is dimensioned in such a way that disk 20 can be passed over the torus 57 on hub 52. Supporting disk 20 is upwardly secured by means of the retaining ring 150, which portionally engages over said disk, whilst the rim is secured by the actual fixing disk 50.

As shown in FIGS. 2, 3 and 4, each support arm 40 of antiskid device 10 is provided with a plurality of wear protection strips 270 being at right angles to the longitudinal direction of the support arm, and which are arranged in spaced manner on the latter. These wear protection strips are made from metallic or other wearresistant materials and are fixed to the support arm 40 and for fixing said strips 270 each support arm 40 can be provided in the fitting area of said strips with a groove-like recess, where the e.g. circular strips 270 are held in press fitting manner. It is advantageous if the wear protection strips 270 are constructed in web-like, i.e. raised manner on their side remote from the tire tread, whereas on the side facing the tire tread, the corresponding portion of the strips is integrated into he material of the support arm 40, in order to lead to a flush termination of the support arm surface. In order to increase grip, each support arm 40 can also be provided with a wear protection strip passing in the longitudinal direction of the support arm.

In the embodiment shown in FIG. 17, there are two recesses 156 and the inner wall surface 150a of retaining ring 150, in which engage a number of leaf spring-like catches 160 corresponding to the number of recesses. The number of recesses 156 is not limited to two. Thus, it is possible to provide five recesses 156, if this number should be required. One catch 160 then engages in each recess so that for five catches there are five recesses. In this case the unlocking key 70 must have a corresponding number of pressure tongues, so as to be able to force the catches 160 out of the recesses to permit mounting of retaining ring 150 on hub 52 and consequently an unlocking action.

Fixing disk 50 is provided on its wall surface 50a remote from hub 52 in the vicinity of the rim screw or wheel stud openings 51 with spacing rings 80, which are constructed as interchangeable adaptors. This makes it possible to adapt the fixing device to different tire sizes by different size spacing rings 80.

The fixing of an antiskid device 10 comprising supporting disk 20 and arms 40 to the rim or wheel 11 of a vehicle using the fixing device comprising fixing disk 50 and retaining ring 150 takes place in such a way that after fixing the fixing disk 50 by means of rim screws, wheel studs, etc. 18 to the rim 11, supporting disk 20 of antiskid device 10 is mounted on hub 52 of disk 50. The retaining ring 150 is not mounted, so that its locking webs 155 come to rest in the gaps between the bead-like shoulders 55 on hub 52. This is followed by the insertion of pressure tongues 72, 73 of unlocking key 70 into recesses 75 and the subsequent pivoting of unlocking key 70 in the direction of arrow X (FIG. 17), so that the retaining ring 150 pivoted about its vertical median axis until the locking web 155 on inner wall surface 150a of retaining ring 150 comes to rest in the recesses forming the slideways and guideways 60. Simultaneously he leaf spring-like catches 160 lock in self-sprung manner in recesses 152 of hub 52, so that locking against unintentional release of the retaining ring 150 takes place. Due to the fact that the free ends of catches 160 come to rest in stop-like recesses 155, a reliable locking action is ensured. Due to the fact that these stop recesses 153 are constructed in undercut manner and the free ends of catches 160 have a roughly wedge-shaped configuration, it is ensured that the free ends of catches 160 cannot spring out of recesses 153.

Thus, antiskid device 10 is held on the rim 11 of the vehicle wheel by means of the fixing device comprising fixing disk 50 and retaining ring 150, in such a way that the support arms 40 of antiskid device 10 engage over the tire tread.

The antiskid device 10 is removed with the aid of unlocking key 70, pressure tongues 72, 73 and once again inserted in recesses 75. By pivoting the unlocking key 70 the leaf spring-like catches 160 are moved out of their locking position into their initial position in the recesses 156 on the inner wall surface 150a of retaining ring 150. There is a simultaneous rotation of ring 150 until the locking webs 155 thereof are moved out of the slideways and guideways 60 of hub 52, enabling the ring 150 to be removed. This is followed by a removal of the support disk 20 of antiskid device 10 from hub 52 of fixing disk 50. In the case of further non-use of the antiskid device 10, but on wishing to keep the fixing device ready, retaining ring 150 is merely mounted on fixing disk 50, so that it is at any time possible to fit antiskid device 10 if this should be required.

Supporting disk 20 of antiskid device 10 is provided with a central opening, so that disk 20 can be mounted on hub 52 of fixing disk 50. The diameter of said central opening is larger than the diameter of hub 52, so that the supporting disk 20 of antiskid device 10 is held on hub 52 can perform eccentric movements. It is possible in this way that the antiskid arms 40 engaging over the tire tread in conjunction with the supporting disk 20 adapt to the squeezing movements of the moving tire. Moreover, the diameter of the central opening in supporting disk 20 is dimensioned in such a way that disk 20 can be passed over torus 57 on hub 52. The upward securing of the supporting disk takes place by means of the retaining ring 150 which proportionally overlaps said disk, whilst fixing disk 50 secures the same towards the rim.

Figure 14:
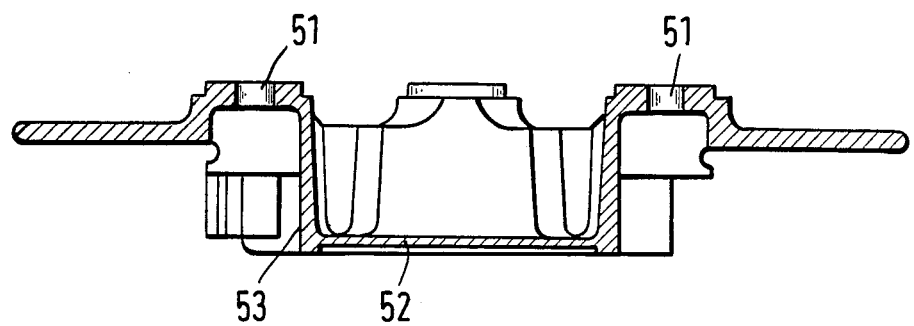
FIG. 14 a vertical section through the fixing disk.

In order to be able to fix fixing disk 50 with its hub 52 to the wheel disk or rim of a vehicle, disk 50 is provided on its side remote from supporting disk 20 with an adaptor disk 300, which is connected to the hub 52 of fixing disk 50 by screw connections 350. For fixing adaptor disk 300 to hub 52 of fixing disk 50, adaptor disk 300 is provided with a plurality of hub fixing screw reception bores 340 in a circular line 341 about the centre M of adaptor disk 300 and they are aligned with bores 51 (FIGS. 13 and 14) of hub 52 of fixing disk 50, the number of bores 340 corresponding to the number of bores 51 of hub 52. These hub fixing screw reception bores 340 are arranged equidistantly. In the case of the embodiment of FIGS. 3 and 10, there are four reception bores 340 in adaptor disk 300, whereas in the embodiment of the adaptor disk 300 shown in FIG. 11, there are five reception bores 340 on cicular line 341. The number of such bores 340 depends on the size of the fixing disk 50 with its hub 52. Bores 340 are provided with internal threads, so that after inserting the corresponding screws, the fixing disk 50 mounted on the adaptor disk 300 is detachably connectable therewith.

Figure 20:
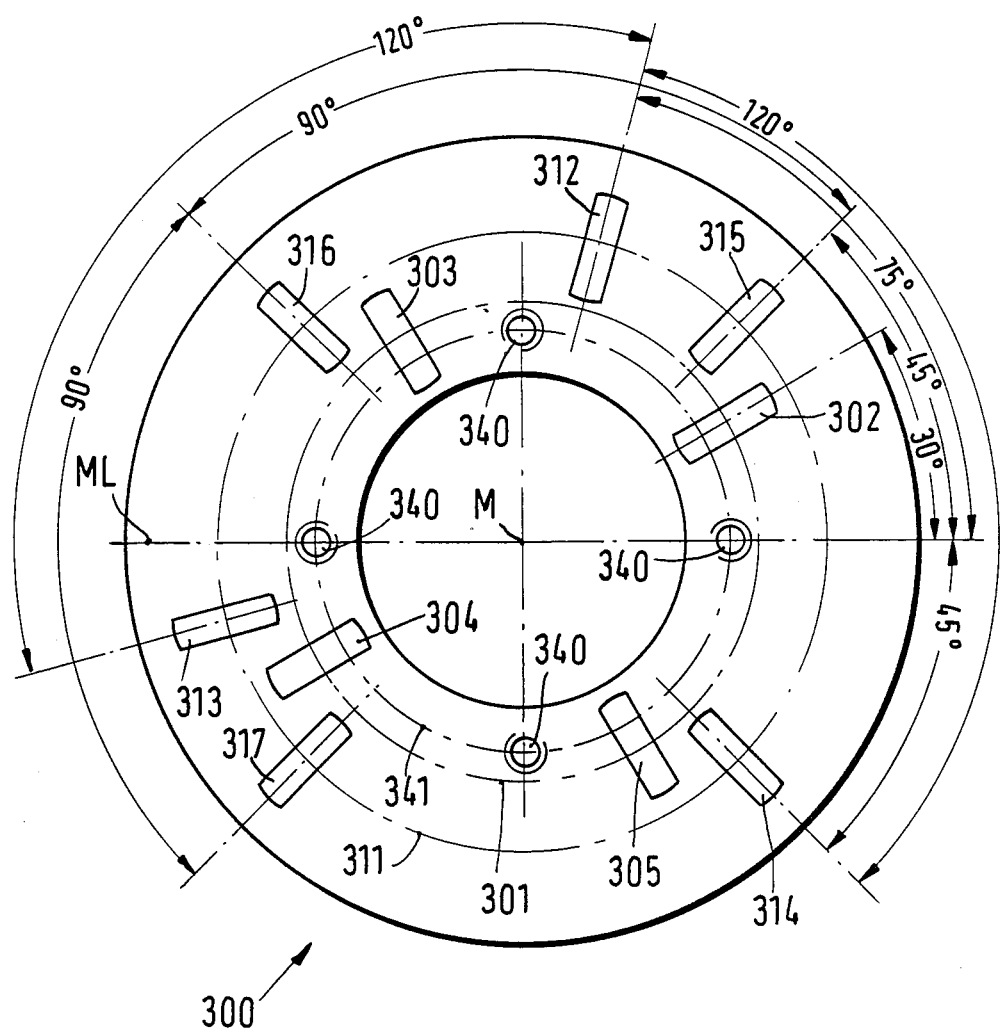
FIG. 20 an adaptor disk in plan view.

Adaptor disk 300 has a plurality of radially directed oblong holes 302, 303, 304, 305, and 312, 323, 314, 315, 316, 317, which are constructed with identical, non-identical or numerous pitches in adaptor disk 300 (FIG. 20).

In the case of adaptor disk 300 shown in FIG. 20, the oblong holes are distributed over two circular lines with different diameters. Oblong holes 302 to 305 are equidistantly spaced on circular line 301 adjacent to the centre M of adaptor disk 300, whilst oblong holes 312 to 314 and 315 to 317 are in part non-equidistantly spaced on the outer circular line 311. There are four oblong holes on the circular line 301 adjacent to centre M of adaptor disk 311, whilst there are six oblong holes on the outer circular line 311.

The arrangement of the oblong holes 302 to 305 on the inner circular line 301 is such that the first hole 302 is at a distance of approximately 30° from the centre line ML placed through the adaptor disk centre M. As regards the six oblong holes 312 to 314 and 315 to 317 located on the outer circular line 311 of adaptor disk 300, oblong holes 312, 313, 314 are equidistantly spaced. Between the individual holes, this distance is approximately 120°, the first oblong hole 312 starting approximately 75° from the centre line ML. The spacing between the following oblong holes 313, 314 then amounts to approximately 120° between the individual holes.

The further oblong holes 315, 316, 317 of the outer circular line are arranged as follows on adaptor disk 300. The first oblong hole 315 is at a distance of approximately 45° from the centre line ML. Anticlockwise this is followed by oblong holes 316, 317, the spacing of hole 315 from hole 316 and the spacing of hole 316 from hole 317 is approximately 90°, the two holes 315, 317 facing one another. The spacing and arrangement of oblong holes 312 to 315 and 312 to 314 and 315 to 317 in adaptor disks 300 shown in FIG. 10 is then obtained.

Figure 21:
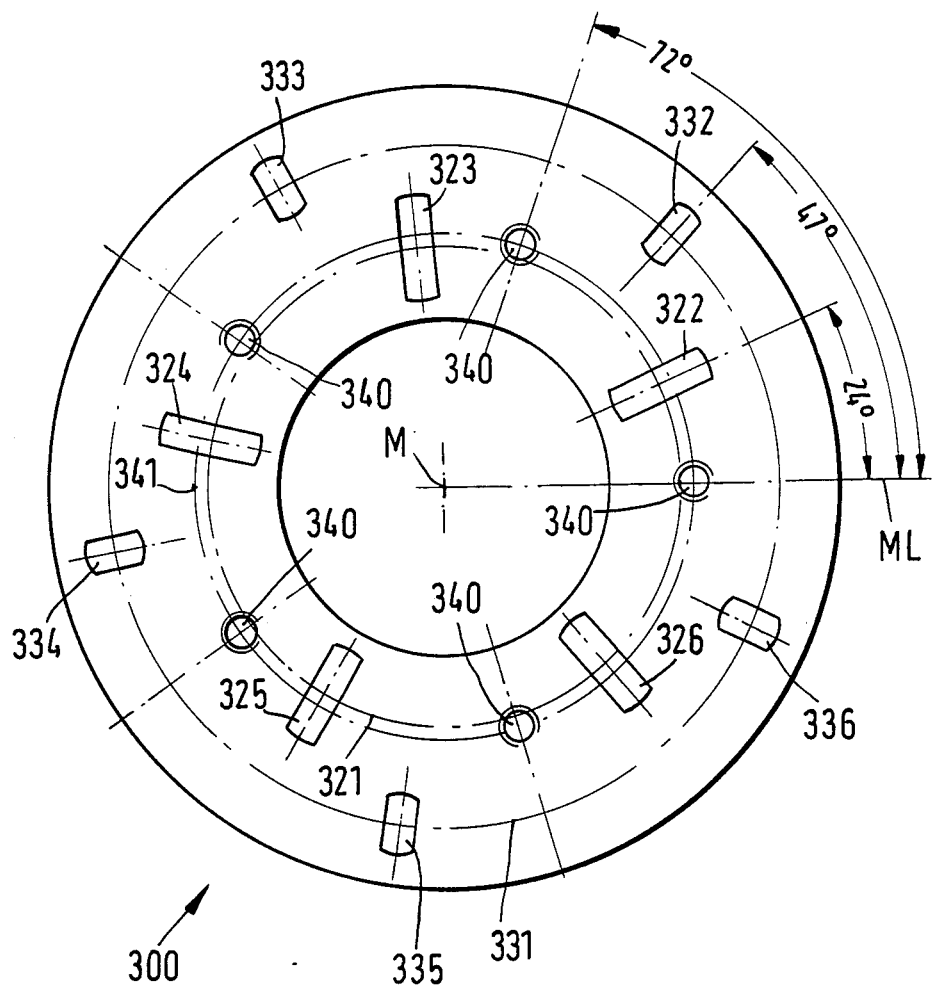
FIG. 21 another embodiment of an adaptor disk.

The embodiment of an adaptor disk 300 shown in FIG. 21, there are five radially distributed, equidistantly spaced oblong holes 322 to 326 on a circular line 321 facing the centre M of the adaptor disk, whereas on the outer circular line 331 five further oblong holes 332 to 336 are formed in the adaptor disk, which are also radially and equidistantly arranged. However, oblong holes 332 to 336 are displaced with respect to the other oblong holes 322 to 326. The first oblong hole 322 arranged on the inner circular line 321 is arranged at a distance of approximately 24° from the centre line ML placed through the adaptor disk centre M, and is then equidistantly followed by the further oblong holes 323 to 326. This is followed by a first oblong hole 332 of those located on the outer circular line 331 at a distance of approximately 47° from the centre line ML, followed by the equidistantly spaced further oblong holes 333 to 336. The hub fixing screw bores 340 on circular line 341 are so positioned with respect to oblong holes 322 to 326 and 332 to 336, that the first reception bore 340 is on centre line ML and the in each case following reception bore is arranged at a distance of approximately 72° from the in each case preceding bore. In the case of adaptor disk 300 according to FIG. 21, the oblong holes 332 to 336 are shorter than oblong holes 332 to 336. Oblong holes 332 to 336 have roughly half the length of oblong holes 322 to 326. In the case of the adaptor disk 300 according to FIG. 10, all the oblong holes are of the same length. The arrangement of the oblong holes on their circular lines is such that the circular lines pass through the centres of the oblong holes.

Adaptor disk 300 is made from metallic and in particular corrosion-resistant materials, but it is also possible to use other high strength materials for manufacturing the adaptor disk.

What is claimed is:

1. An antiskid device, particularly for pneumatically tired vehicle wheels on snow and ice, said device comprising:
   a circular supporting disk;
   means for releasably attaching said supporting disk to a vehicle wheel rim;
   a plurality of support arms extending radially from said supporting disk and adapted to extend over the tread surface of a tire mounted on a vehicle wheel rim to which said supporting disk is attached; and
   a snow chain grid including an outer chain in attachment with the outer ends of said radially extending support arms, said chain grid further including a plurality of further chain portions, each further chain portion having a first end attached to said outer chain and a second end attached to one of said support arms, said outer chain being an endless chain extending in a manner positioning said endless outer chain essentially entirely about the periphery formed by the outer ends of said support arms except for a length of said outer chain secured between an adjacent pair of support arms in a manner positioning said length of said outer chain closely adjacent to the inner edge of each of said adjacent pair of support arms and the peripheral edge of said supporting disk between said adjacent pair of support arms so as to form a U-shaped configuration in said length of said outer chain, whereby the U-shape configuration forms a fitting opening which enables said antiskid device to be fitted in a completely operative position over a tire on a vehicle wheel rim without having to rotate the wheel.

2. An antiskid device according to one of the claim 1 wherein in the vicinity of its free end and close to its two longitudinal edges, each support arm has recesses for receiving and mounting said outer chain grid.

3. An antiskid device according to claim 1 wherein the support arms are detachably and interchangeably fixed to the supporting disk.

4. An antiskid device according to claim 1, wherein each support arm is pivotably secured to said supporting disk and adapted to pivot towards a central region of said supporting disk into a first position.

5. An antiskid device according to claim 1 wherein in the vicinity of the supporting disk, each support arm has a portion externally provided with notches or the like for forming a strap hinge.

6. An antiskid device according to claim 4, further comprising locking means for locking said support arms into the first position.

7. An antiskid device according to claim 1 wherein each support arm has a plurality of wear prevention strips of metallic or other non-wearing materials arranged at right angles to the longitudinal direction of the support arm and positioned in spaced manner therefrom.

8. An antiskid device according to claim 1 wherein each support arm is provided on its outside with at least one wear preventing strip made from wear-resistant materials running in the longitudinal direction of said arm.

9. An antiskid device as recited in claim 1 further comprising:
 a circular fixing disk having a central cylindrical hub extending therefrom, said fixing disk adapted to be secured to the wheel rim;
 a circular retaining ring having a circular aperture formed therein and having attachment means for releasably mounting said retaining ring to said fixing disk such that said fixing disk cylindrical hub extends through the circular aperture;
 said circular supporting disk having a circular aperture formed at the center thereof with a diameter greater than the diameter of said fixing disk cylindrical hub, less than the diameter of said retaining ring and less than the diameter of said fixing disk, said supporting disk being essentially axially fixed between said retaining ring and said fixing disk but free to perform eccentric rotary movement about the exterior surface of said fixing disk cylindrical hub.

10. An antiskid device as claimed in claim 1 wherein said support arms are radially equidistantly spaced, have a prebent profile, and are formed of a plastic material.

11. An antiskid device as claimed in claim 10 further comprising gripping means on the free ends of said prebent support arms for increasing the traction of said antiskid device.

12. An antiskid device as recited in claim 1 wherein said outer chain is secured between said adjacent pair of support arms in an essentially U-shaped configuration by a pair of short chain links, each short chain link having one end attached to the base of one of said adjacent pair of support arms and having its other end secured to said outer chain.

13. An antiskid device as recited in claim 1 wherein each said support arm is adapted to pivot about an axis parallel to the axis about which the wheel rotates.

14. An antiskid device, particularly for pneumatically tired vehicle wheels on snow and ice, comprising:
 a circular supporting disk;
 means for releasably attaching said supporting disk to a vehicle wheel rim;
 a plurality of support arms extending radially from said supporting disk and adapted to extend over the tread surface of a tire mounted on a vehicle wheel rim to which said supporting disk is attached; and
 a snow chain grid including an outer chain comprising a series of links, said outer chain being in attachment with the outer ends of said radially extending support arms, said chain grid further including a plurality of chain portions, each chain portion having a first end attached to said outer chain and a second end attached to one of said support arms, said outer chain being constructed in an interrupted manner having a first end and a second end, said outer chain first end being fixed to one of an adjacent pair of support arms, with one of the links of said outer chain, which is closer in linked distance to said outer chain second end than to said outer chain first end, being fixed to the other of said adjacent pair of support arms, said outer chain first end having a passage ring attached thereto and positioned between said adjacent pair of support arms, the section of chain between said outer chain second end and the link attached to the other of said adjacent pair of support arms passing through said passage ring, and the length of said section of said outer chain being sufficient for said section of said outer chain to lie closely adjacent to the inner edge of said adjacent pair of support arms and the peripheral edge of the supporting disk between said adjacent pair of support arms so as to form a U-shape configuration, and thereby provide a fitting opening between said adjacent pair of support arms to allow said antiskid device to be fitted in a completely operative position over the tire without having to rotate the wheel.

15. An antiskid device as claimed in claim 14 further comprising a fixing device attached to said supporting disk for fixing to said supporting disk a portion of said length of chain, whereby said fixing device enables said outer chain to be tensioned about and essentially above the periphery of the wheel tire after said antiskid device is fitted onto the wheel.

16. An antiskid device as recited in claim 15 wherein said fixing device is a tenterhook.

17. An antiskid device as recited in claim 66 further comprising a plurality of guides arranged on a circular line and fixed onto said supporting disk, and a spring element guided within said guides, with one end of said spring element attached to the second end of said outer chain and the other end of said spring element secured to said supporting disk so as to continuously tension said outer ring about and essentially above the periphery of the wheel tire.

18. An antiskid device according to claim 14, wherein said support arms are detachably and interchangeably fixed to said supporting disk.

19. An antiskid device according to claim 14, wherein each support arm is pivotably secured to said supporting disk and adapted to pivot in the direction of said supporting disk to a first position.

20. An antiskid device according to claim 19 further comprising locking means for locking said support arms in the first position.

21. An antiskid device according to claim 14 further comprising:
 a circular fixing disk having a central cylindrical hub extending therefrom, said fixing disk adapted to be secured to the rim portion of the vehicle wheel;
 a circular retaining ring having a circular aperture therein and attachment means for releasably mounting said retaining ring to said fixing disk such that said fixing disk cylindrical hub extends through the circular aperture;
 said supporting disk having a circular aperture formed at the center thereof with a diameter greater than the diameter of said fixing disk cylindrical hub, less than the diameter of said retaining ring and less than the diameter of said fixing disk, said supporting disk being essentially axially fixed between said retaining ring and said fixing disk but free to perform eccentric rotary movement about the exterior surface of said fixing disk cylindrical hub.

22. An antiskid device according to claim 14 wherein said support arms are radially equidistantly spaced, have a prebent profile, and are formed of a plastic material.

23. An antiskid device according to claim 14 further comprising gripping means on the free ends of said prebent support arms for increasing the traction of said antiskid device.

24. An antiskid device according to claim 14 wherein said support arms are prebent and adapted to pivot about an axis parallel to the axis about which the wheel rotates.

25. An antiskid device, particularly for pneumatically tired vehicle wheels on snow and ice, comprising:
a circular supporting disk;
means for releasably attaching said supporting disk to a vehicle wheel rim;
a plurality of support arms extending radially from said supporting disk and adapted to extend over the tread surface of a tire mounted on a wheel rim to which said supporting disk is attached; and
a snow chain grid including an outer chain in attachment with the outer ends of said radially extending support arms, said chain grid further including a plurality of chain portions, each chain portion having a first end attached to said outer chain and a second end attached to one of said support arms, said outer chain being constructed in an interrupted manner having a first and a second end, with said outer chain first end fixed to one of an adjacent pair of support arms and said outer chain second end fixed to the other of said adjacent pair of support arms such that said outer chain extends about the entire periphery formed by the outer ends of said support arms except for that portion of the periphery between said adjacent pair of support arms, said antiskid device further comprising first and second clips members with each of said clip members being secured at its ends to an upper and lower portion of an inner edge of a respective one of said adjacent pair of support arms;
a chain section having first and second end links, each end link slideably secured to a respective one of said clip members, said chain section having a length approximately equal to the spacing between the lower portion of said clip members, whereby for fitting said antiskid device in completely operative position over a wheel without having to rotate the wheel, said chain section is positioned in the region of the lower portion of said adjacent pair of support arms to form a U-shaped configuration providing a fitting opening, and upon rotation of the wheels said chain section is automatically displaced to a position in the region of the upper portion of said adjacent pair of support arms.

26. An antiskid device according to claim 25, wherein the support arms are detachably and interchangeably fixed to said supporting disk.

27. An antiskid device according to claim 25, wherein each support arm is pivotably secured to said supporting disk and adapted to pivot in the direction of said supporting disk to a first position.

28. An antiskid device according to claim 27 further comprising locking means for locking said support arms in the first position.

29. An antiskid device according to claim 25 further comprising:
a circular fixing disk having a central cylindrical hub extending therefrom, said fixing disk adapted to be secured to the rim portion of the vehicle wheel;
a circular retaining ring having a circular aperture and attachment means for releasably mounting said retaining ring to said fixing disk such that said fixing disk cylindrical hub extends through the circular aperture;
said supporting disk having a circular aperture formed at the center thereof with a diameter greater than the diameter of said fixing disk cylindrical hub, less than the diameter of said retaining ring and less than the diameter of said fixing disk, said supporting disk being essentially axially fixed between said retaining ring and said fixing disk but free to perform eccentric rotary movement about the exterior surface of said fixing disk cylindrical hub.

30. An antiskid device according to claim 25 wherein said support arms are radially equidistantly spaced, have a prebent profile, and are formed of a plastic material.

31. An antiskid device according to claim 25 further comprising gripping means on the free ends of said prebent support arms for increasing the traction of said antiskid device.

32. An antiskid device according to claim 25 wherein said support arms are prebent and adapted to pivot about an axis parallel to the axis about which the wheel rotates.

33. An antiskid device according to claim 25 wherein said clip members conically taper from the upper portion to the lower portion.

* * * * *